(12) United States Patent
David et al.

(10) Patent No.: US 9,188,422 B2
(45) Date of Patent: Nov. 17, 2015

(54) METHOD AND DEVICE FOR ACQUISITION OF A GEOMETRIC SHAPE

(75) Inventors: Dominique David, Claix (FR); Nathalie Sprynski, Caissargues (FR)

(73) Assignee: COMMISSARIAT A L'ENERGIE ATOMIQUE, Paris (FR)

( * ) Notice: Subject to any disclaimer, the term of this patent is extended or adjusted under 35 U.S.C. 154(b) by 708 days.

(21) Appl. No.: 11/885,022

(22) PCT Filed: Mar. 6, 2006

(86) PCT No.: PCT/FR2006/050196
§ 371 (c)(1),
(2), (4) Date: Aug. 24, 2007

(87) PCT Pub. No.: WO2006/095109
PCT Pub. Date: Sep. 14, 2006

(65) Prior Publication Data
US 2008/0211808 A1 Sep. 4, 2008

(30) Foreign Application Priority Data
Mar. 9, 2005 (FR) ...................................... 05 50620

(51) Int. Cl.
*G06T 17/00* (2006.01)
*G01B 7/287* (2006.01)
*G06T 17/10* (2006.01)
*G06T 19/00* (2011.01)
*G06T 17/20* (2006.01)

(52) U.S. Cl.
CPC ................. *G01B 7/287* (2013.01); *G06T 17/00* (2013.01); *G06T 17/005* (2013.01); *G06T 17/10* (2013.01); *G06T 17/20* (2013.01); *G06T 19/00* (2013.01)

(58) Field of Classification Search
CPC ......... G06T 17/20; G06T 19/00; G06T 17/00; G06T 17/10; G06T 17/005
USPC .................. 345/419–427; 382/141–152, 108, 382/279–280; 700/91–306
See application file for complete search history.

(56) References Cited

U.S. PATENT DOCUMENTS

| 4,573,131 A | * | 2/1986 | Corbin ........................ 702/168 |
| 5,606,124 A | * | 2/1997 | Doyle et al. ................ 73/152.01 |
| 5,617,371 A | * | 4/1997 | Williams ........................ 367/13 |
| 6,127,672 A | | 10/2000 | Danisch .................... 250/227.14 |
| 6,256,039 B1 | * | 7/2001 | Krishnamurthy ............. 345/420 |
| 6,373,978 B1 | * | 4/2002 | Ishihara ........................ 382/154 |
| 6,487,516 B1 | * | 11/2002 | Amorai-Moriya ............ 702/152 |
| 6,515,669 B1 | * | 2/2003 | Mohri ........................... 345/474 |

(Continued)

OTHER PUBLICATIONS

International Search Report in French, FA 661460 and FR 0550620, 3 pgs, (Sep. 23, 2005).

(Continued)

*Primary Examiner* — Abderrahim Merouan
(74) *Attorney, Agent, or Firm* — Nixon Peabody LLP; Khaled Shami

(57) ABSTRACT

According to the invention, a set of sensors (4a) is placed on this shape (curve or surface), each sensor outputting signals representative of the orientation of the curve or the surface at the location of this sensor; a model of the curve or the surface is chosen; model parameters are determined from the signals; and the spatial distribution of the points on the geometric shape are determined using these parameters. The invention particularly applies to machining, joinery, masonry, and building domains.

18 Claims, 3 Drawing Sheets

(56) References Cited

U.S. PATENT DOCUMENTS

| | | | |
|---|---|---|---|
| 6,612,992 B1* | 9/2003 | Hossack et al. | 600/467 |
| 6,640,202 B1* | 10/2003 | Dietz et al. | 702/167 |
| 6,701,633 B2* | 3/2004 | Ohtsuka | 33/552 |
| 6,771,071 B1* | 8/2004 | Wright et al. | 324/318 |
| 6,810,753 B2* | 11/2004 | Valdevit et al. | 73/862.045 |
| 6,846,286 B2* | 1/2005 | Suzuki et al. | 600/145 |
| 6,854,327 B2* | 2/2005 | Rambow et al. | 73/250 |
| 6,901,171 B1* | 5/2005 | Dutta-Choudhury et al. | 382/266 |
| 6,957,164 B2* | 10/2005 | Dietz et al. | 702/155 |
| 7,003,894 B2* | 2/2006 | Schajer et al. | 33/552 |
| 7,212,197 B1* | 5/2007 | Schkolne et al. | 345/419 |
| 7,289,121 B1* | 10/2007 | Balakrishnan et al. | 345/441 |
| 7,587,837 B2* | 9/2009 | David et al. | 33/561.1 |
| 7,896,069 B2* | 3/2011 | Dria et al. | 166/250.01 |
| 2002/0025074 A1* | 2/2002 | Wilhelm | 382/203 |
| 2003/0030443 A1* | 2/2003 | Walker et al. | 324/458 |
| 2004/0125073 A1* | 7/2004 | Potter et al. | 345/156 |
| 2004/0139801 A1* | 7/2004 | Wilk | 73/627 |
| 2004/0238222 A1* | 12/2004 | Harrison | 175/61 |
| 2005/0076522 A1* | 4/2005 | Matsuki et al. | 33/554 |
| 2005/0194185 A1* | 9/2005 | Gleitman | 175/45 |
| 2006/0021235 A1* | 2/2006 | Becker | 33/282 |
| 2006/0169023 A1* | 8/2006 | David | 73/9 |
| 2007/0052974 A1* | 3/2007 | Tubic et al. | 356/604 |
| 2007/0078554 A1* | 4/2007 | St. Ville | 700/98 |
| 2008/0066334 A1* | 3/2008 | David et al. | 33/755 |

OTHER PUBLICATIONS

Nerino, Robert et al., "A Surface Profile Reconstruction method Based on Multisensor Capacitive Transducers", Measurement, Institute of measurement and Control. London, GB, vol. 13, No. 1, Mar. 1, 1994, pp. 77-84, XP000442468 ISSN: 0263-2241.

* cited by examiner

METHOD AND DEVICE FOR ACQUISITION OF A GEOMETRIC SHAPE

CROSS REFERENCE TO RELATED APPLICATIONS OR PRIORITY CLAIM

This application is a national phase of International Application No. PCT/FR2006/050196 entitled "Method And Device For Acquiring A Geometric Form", which was filed on Mar. 6, 2006, which was not published in English, and which claims priority of the French Patent Application No. 05 50620 filed Mar. 9, 2005.

TECHNICAL DOMAIN

The invention relates to a method and device for acquisition of a geometric shape that may be a line or a surface.

It thus relates to the acquisition of curves and surfaces that may be plane, but are usually warped.

Therefore the invention relates more particularly to three-dimensional acquisition (3D acquisition) of shapes (lines or surfaces).

It is particularly applicable to:

the machining, joinery, masonry, building and manufacturing of consumer household goods fields, checking shapes, acquisition of warped shapes, for example such as automobile bodywork, and the study of laminar flows in the context of aerodynamic or hydrodynamic studies, by monitoring of appropriate sensors floating in a moving gas or liquid, in time.

STATE OF PRIOR ART

A 3D acquisition technique is already known based on laser triangulation; but this technique is expensive, leads to the generation of hidden parts of objects to which it is applied, and especially requires reconstruction algorithms that are difficult to control.

Another 3D acquisition technique is known that uses the movement of one or several video cameras to make stereoscopic records of the studied objects. But this technique is generally expensive and complex.

Moreover in both cases, equipment external to the studied object is necessary.

PRESENTATION OF THE INVENTION

The purpose of this invention is to remedy the above-mentioned disadvantages, by proposing an acquisition technique that is simpler, less expensive and easier to implement that the known techniques mentioned above.

It provides an easy way of making the three-dimensional geometric description of an object.

The invention is equally applicable to rigid and to flexible objects, such as clothing. The invention can also be applied to describe variations in the shape of a non-rigid object with time.

This invention is applicable in a real situation; for example, it would be possible to consider analysing the drag behaviour of a vehicle or an aircraft wing.

According to one particular aspect of the invention, angular sensors distributed on a curve or a surface are used, this curve or surface being capable of matching the shape to be determined. A signal processing method is used to determine the coordinates of each point at which sensors are located. The spatial distribution of points that make up the studied shape can thus be deduced.

Note also that in theory, conventional techniques can be used to manufacture sensors to implement this invention. However, microtechnologies or nanotechnologies are essential to enable development of the invention.

Micro technologies or nanotechnologies enable the use of sensors or measurement elements with a weight that is negligible compared with the total weight of a device for implementation of the invention. Thus any material can be transformed to implement the invention without affecting the initial mechanical characteristics of the material.

Micro technologies or nanotechnologies also enable the use of a large number of measurement points in the material, namely hundreds or even thousands of measurement points, or more, which broadens the field of applications of the invention.

Specifically, the purpose of this invention is a method for acquisition of a geometric shape, namely a curve or a surface, by determining the coordinates of the points on this curve or this surface, this method being characterised in that:

a set of sensors is placed on this shape, each sensor being designed to output signals representative of the orientation of the curve or the surface at the location of this sensor, a model of the curve or the surface is chosen, model parameters are determined from the signals, and the spatial distribution of the points on the geometric shape are determined using these parameters.

According to a first particular embodiment of the method according to the invention, the sensors are fixed to a support made of a deformable solid material capable of matching the shape to be acquired.

This support can form a line or a surface.

According to a first particular embodiment of the invention, the support is flexible.

In this case, if the shape to be acquired has one or several maximum spatial frequencies and the number of sensors per unit length or unit area is equal to at least twice the value of the maximum frequency, then the curve or the surface can be locally sampled using the sensors.

According to a second particular embodiment of the method according to the invention, the sensors are mechanically independent of each other (instead of being integral with each other, for example by means of a support), and the shape to be acquired is reconstructed step by step using signals output by the sensors.

With the invention, the shape of a curve or a surface that delimits an object can be acquired.

But if the support made of the solid and deformable material is used, the intrinsic shape of this material itself can be acquired.

With the invention, each sensor can also be designed to determine the distance that separates it from nearby sensors, and the shape to be acquired is then reconstructed step by step.

This invention also relates to a device for acquisition of a geometric shape, namely a curve or a surface, this device being characterised in that it comprises:

a set of sensors, each sensor being designed to output signals representative of the orientation of the curve or the surface at the location of this sensor, and electronic means for processing signals output by sensors, these means being designed to determine model parameters using a model of the curve or the surface, and to use these coordinates to determine the spatial distribution of the points on the geometric shape.

According to a first particular embodiment of the device according to the invention, the sensors are fixed to a support made of a solid and deformable material, capable of matching the shape to be acquired.

According to a second particular embodiment, the sensors are mechanically independent of each other.

The sensors may be chosen to be accelerometers or magnetometers.

BRIEF DESCRIPTION OF THE DRAWINGS

This invention will be better understood after reading the description of example embodiments given below, purely for information and in no way limitative, with reference to the appended drawings in which.

DETAILED PRESENTATION OF PARTICULAR EMBODIMENTS

Figure 1A:
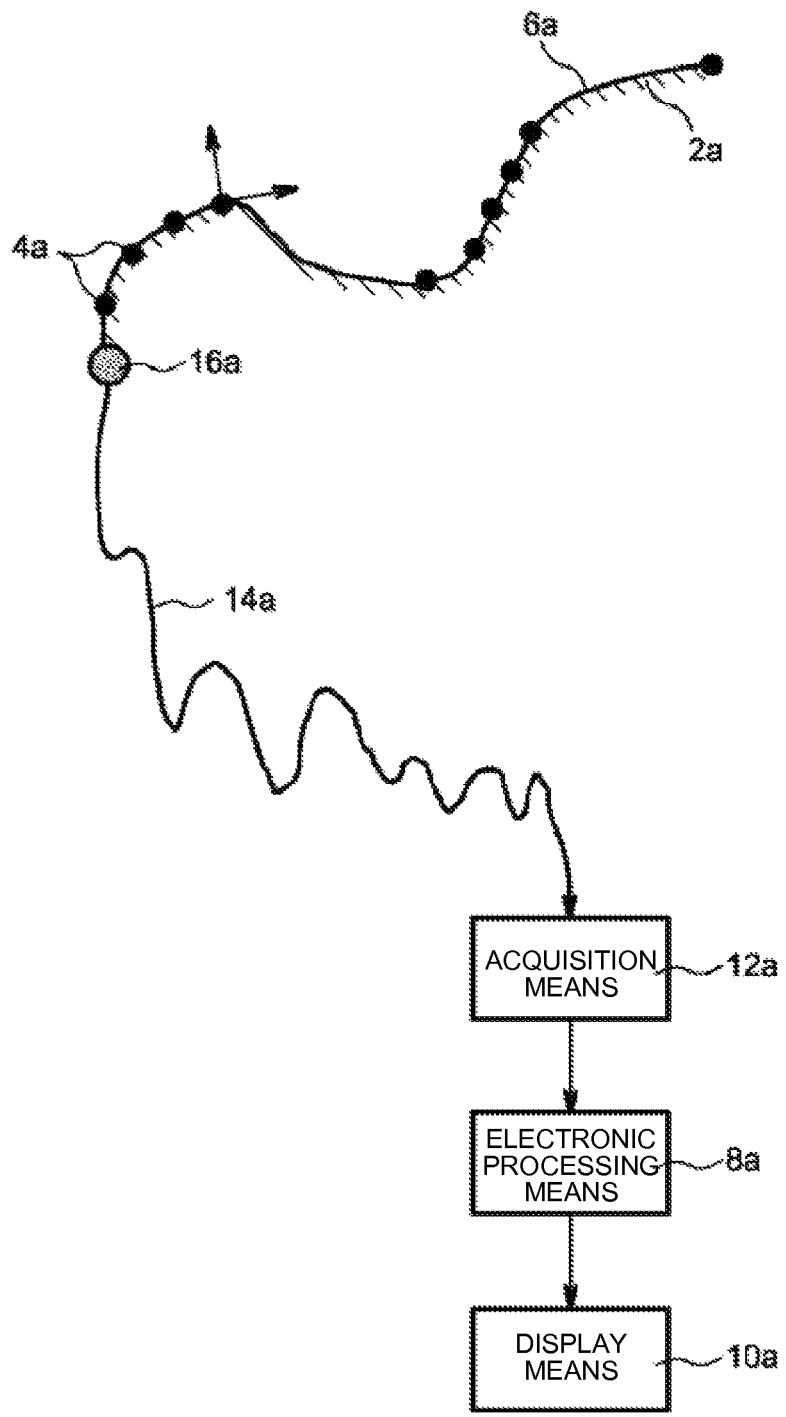
FIG. 1A is a diagrammatic view of a particular embodiment of the device according to the invention, for acquisition of a curve.
Figure 1B:
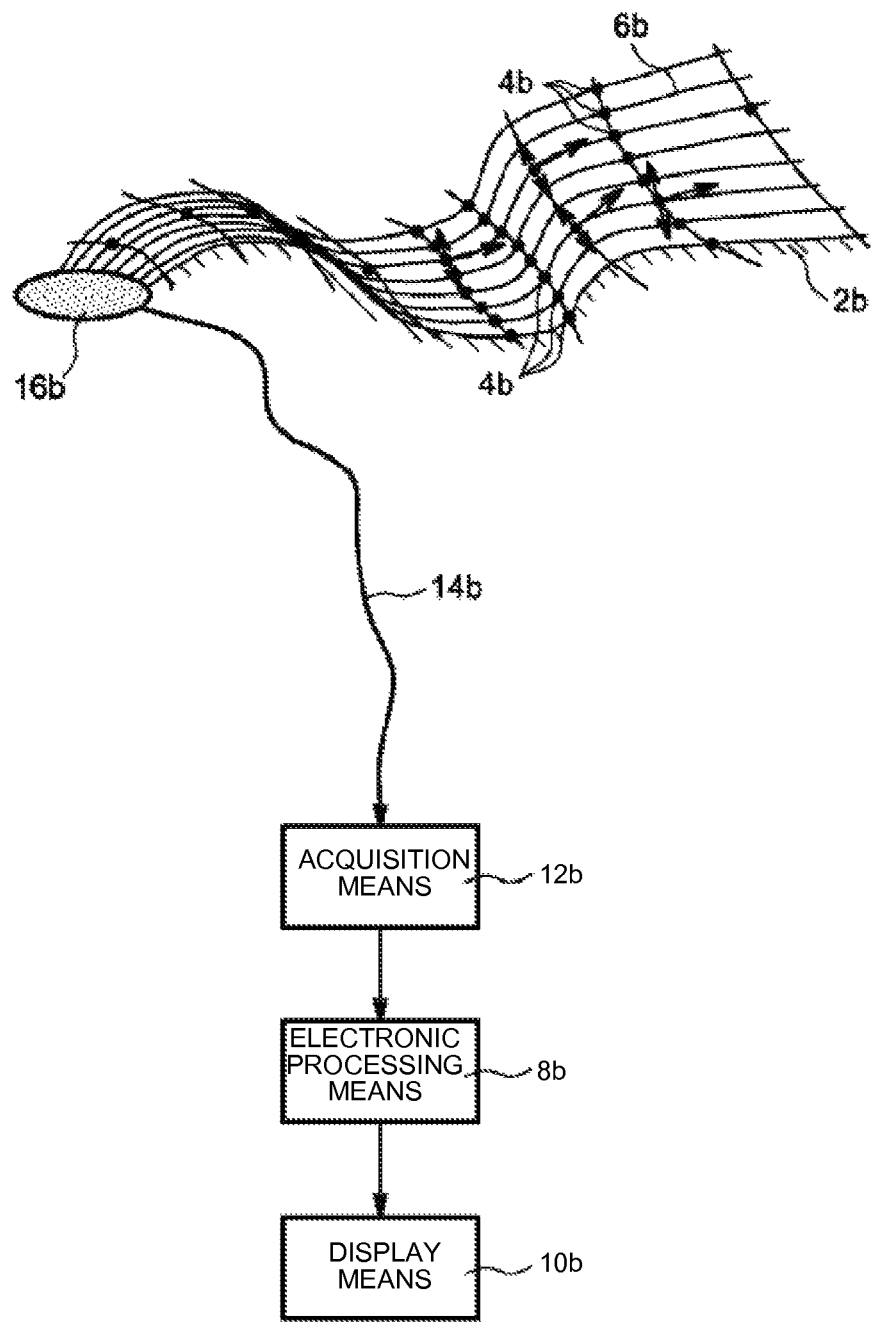
FIG. 1B is a diagrammatic view of another particular embodiment of the device according to the invention, for acquisition of a surface.

FIGS. 1A and 1B show diagrammatic views of particular embodiments of the device according to the invention for the acquisition of a geometric shape, capable of acquiring a curve or a surface.

The device in FIG. 1A is capable of acquiring a curve that delimits an object 2a, while the device in FIG. 1B is capable of acquiring a surface that delimits another object 2b.

The device in FIG. 1A or 1B comprises a set of sensors 4a or 4b, that are placed on the curve delimiting the object 2a or on the surface delimiting the object 2b. Each sensor is, designed to output electrical signals representative of the orientation of this curve or this surface, at the position of the sensor considered.

Sensors 4a or 4b, that may for example be accelerometers or magnetometers, are fixed to a support 6a or 6b, that is made from a solid and deformable material capable of matching the shape to be acquired.

The support 6a in the example in FIG. 1A forms a line, while the support 6b in the example in FIG. 1B forms a surface.

The device in FIG. 1A or 1B also comprises electronic processing means 8a or 8b designed to process signals output by sensors 4a or 4b, to determine the coordinates of each of the points at which these sensors are located and also to use these coordinates to determine the spatial distribution of the points on the curve 2b or the surface 2b.

FIG. 1A or 1B also shows display means 10a or 10b to display the results of calculations made by the electronic processing means 8a or 8b.

The figures also show acquisition means 12a or 12b, for the acquisition of measurements made using the sensors 4a or 4b. Measurements acquired by the means 12a or 12b are transmitted to the electronic processing means 8a or 8b.

Sensors 4a or 4b are connected to acquisition means 12a or 12b through wire or wireless links 14a or 14b.

In FIG. 1A or 1B, reference 16a or 16b represents (optionally) electronics onboard the support provided to collect information from the sensors, and then to transmit this information (possibly by wireless) to a calculation device.

Consider once again the support used in the invention. This support is made of a material sufficiently flexible to match the measured shape. As we have seen, this support may follow a line or a curve. In both cases, the support can be totally free. For example, this can be a simple string in the case in which it forms a line.

But on the contrary, this support may have particular flexibility properties (for example a maximum allowable curvature or controlled elasticity) or it may have properties intermediate between the case of a completely free support and the case of a support with a particular flexibility. For example, it is worth mentioning flexible rulers used by architects as supports with these intermediate properties.

The sensors that are arranged on the support, are capable of providing geometric information.

For example, simple accelerometers can be used, each capable of providing an inclination from the vertical direction. Biaxial accelerometers can also be used, each of which provides two inclinations from the vertical direction. Magnetometers that each provide an inclination from the direction of the terrestrial magnetic field can also be used.

In the invention, sensors can also be used such that each sensor is capable of not only providing geometric information but also determining the distance separating it from sensors which constitute its nearest neighbours. For example, such sensors can be composed of radio frequency Microsystems determining the distance separating them by a classical triangulation or time of flight measurement method.

As described above, the sensors are electrically connected to electronic acquisition means. It may be practical to use a serial bus between all or some of the sensors, so as to limit the number of wires required to collect the information. Furthermore, the processing means that are connected to these acquisition means, are typically a computer such as a personal computer (PC).

A device conforming with the invention may be used to acquire (a) the shape of a given curve or surface, for example the template for a warped cutout or the surface of a piece of furniture, or (b) the intrinsic shape of the material from which the support is formed, for example in the case in which it is required to determine how a textile drapes.

Methods conforming with the invention that are described below are always valid in the first case (a). On the other hand, in the second case (b), they are only valid provided that the weight of the measurement elements, namely sensors, and the stiffness (if any) due to the interconnection of sensors, do not modify the intrinsic behaviour of the support material. This is made possible by the use of microtechnologies.

Even so, it would be possible to envisage another device conforming with the invention, using sensors with non-negligible weights compared with the weight of the material used as support for these sensors. However, in this case, the method for reconstruction of this material, in other words, the process for determining the shape matched by this material, is much more complex, so long as such a method can be implemented.

Therefore, this is a case in which miniaturisation goes beyond a simple scale factor and provides a new feasibility.

As described above, the method according to the invention is implemented by placing the support in contact with an object that is to be measured. Several cases can arise.

1. Non-rigid support, for example like a string.

Figure 2:
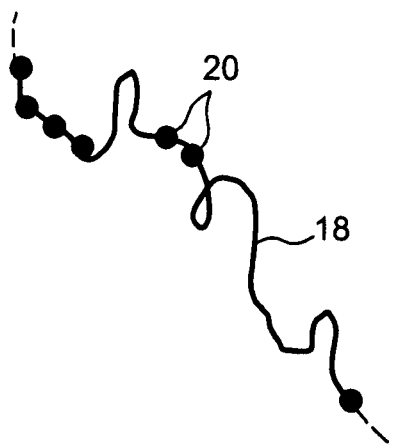
FIG. 2 is a partial diagrammatic view of a non-rigid support that can be used in the invention.

This case is diagrammatically shown in FIG. 2 which shows such a support 18, like a string and therefore forming a line, or more precisely a warped curve. Sensors 20 are fixed on this support, along the support.

A non-rigid support is adapted to the acquisition of the shape of a material, for example such as a textile. For example, the deformations of a fabric or the manner in which this fabric drapes, can thus be measured. The sensors are fixed to the textile such that the respective distances between the sensors are known in the rest state, in other words when the textile is completely taut and therefore includes plane parts. Two sub-cases can then arise.

1a. there is a sufficiently large number of sensors such that the data supplied by the sensors provide local sampling of the surface to be analysed. For example, a set of accelerometers and magnetometers can then acquire local tangents to the surface of the textile studied.

By analogy with Shannon's theorem, the number of sensors necessary to analyse a given curve or surface, can be deduced from an analysis of the spatial frequencies present in the curve or the surface. The number of sensors shall not be less than twice the value of the maximum frequency.

If the number of sensors is very much larger than the spatial frequencies present in the shape to be analysed, an oversampling situation arises. In this case, the following method makes it possible to find the acquired curve or surface.

Each portion surrounding a sensor is treated like a straight line segment (for a line-shaped support) or a portion of a plane (for a support forming a surface). The reconstruction is made by successive juxtaposition of all segments or all elementary portions, each segment or portion being oriented as a function of the value output by the sensor supported on this segment or this portion.

Figure 3:
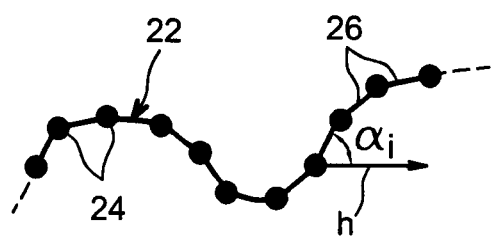
FIG. 3 is a partial diagrammatic view of a support that can be used in the invention, forming a line of which each portion between two sensors is treated like a straight line segment.

FIG. 3 clarifies this subject, showing the reconstruction by straight line elements. It shows a support forming a line 22. It also shows sensors 24 fixed to this support 22. Between sensors, the support is treated like straight line segments 26. It also shows the angle $\alpha_i$ formed by the $i^{th}$ of these segments 26 with a horizontal direction h, this segment being tangent to the studied shape, at the point at which one of the two sensors forming this segment is located.

1b. The number of sensors is <<limited>>, close to twice the value of the maximum frequency.

In this case, the method according to the invention consists of assigning a particular model that is no longer locally linear, as in case 1a but is more complex.

For example, the curve is modeled by an analytic formulation, for example by a two- or three-dimensional Beziers curve, or by a two- or three-dimensional B-spline. The surface can be modeled by a polynomial of the f(x, y, z)=0 type or by a Beziers surface.

When the sensors output signals representative of angles measured locally on the studied curve or surface, the measurements thus obtained are associated with the analytic formulation of these same local angles, this formulation being deduced from the chosen model.

Solution of the system of equations thus obtained gives an estimate of model parameters. In this case, note that the measured surfaces and curves must satisfy spatial frequency criteria that are compatible with the number of sensors in the device conforming with the invention used. Further information on this subject is given in the above paragraph 1a.

An example of a method of calculating an acquired surface is given below for the case of a direct calculation, for information and without being limitative in any way.

Let z=f(x, y) be the equation for the required surface. The sensor measurements at point Mi are denoted Pi1, Pi2, etc. The known curvilinear abscissa of point Mi is also denoted ACi.

For example, the sensors provide the values of the inclinations from the vertical and from the earth's magnetic field, of the local tangent plane at Mi, these sensors being accelerometers and magnetometers in the example considered. These values are converted into local tangents to the required surface.

This required surface is determined by solving the system composed of the following three equations:

$$Pi1 = df(xi, yi)/dxi$$

$$Pi2 = df(xi, yi)/dyi$$

Curvilinear abscissa at point $(xi, yi) = ACi$.

In this system of equations, Pi1 and Pi2 correspond to the tangents and ACi corresponds to the relative position of the sensors before deformation of the studied surface.

The piecewise linear functions Pi1 and Pi2 can advantageously be smoothed before an integration which makes it possible to obtain the required shape description, for example by using cubic splines or radial basis functions (RBF).

Another example of the method according to the invention for calculation of an acquired surface in the case of an inverse calculation is given below, without being in any way limitative.

This calculation involves several steps.

Step 1: an assumption is made about a parameter q, resulting in the following equation:
Z=f(x, y, q0) where q0 is the initial parameters vector that defines the initial representation of the curve.

Step 2: this equation is used to determine the estimated measurements Ri of the values of local tangents, for example:
Ri1=df(xi, yi, q0)/dx (local calculation of tangents).

Step 3: the estimated measurements Ei of outputs from angular sensors supposedly at points (xi, yi) are also determined.

Step 4: the results obtained in steps 2 and 3 are used to calculate the distance between the real outputs from sensors Pi and their estimated values Ei.

Step 5: the result is displayed if the calculated distance is less than a predetermined threshold, for example 1% of the value measured by the sensors.

Step 6: if this distance is greater than or equal to this predefined threshold, classical methods are used (for example using a gradient descent method) to update the vector q0 and replace it with a new vector q1, that is the vector of parameters of the curve or the surface in the first iteration, and the second step is restarted with this new vector.

Figure 4:
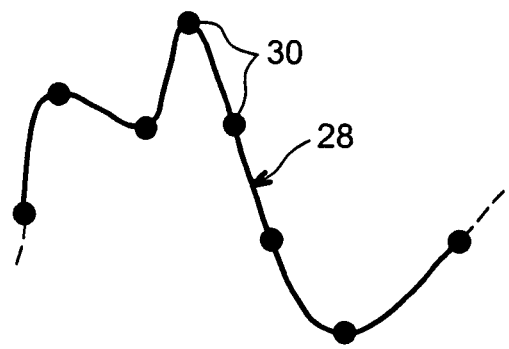
FIG. 4 is a partial diagrammatic view of a rigid support that can be used in the invention.

2. The support is rigid (see FIG. 4 in which an example of such a support is shown diagrammatically, this support matching the shape of a line 28 and carrying sensors 30, the length of intervals between the sensors being related to the maximum measurable curvature and dependent on the stiffness properties of the prestressed material from which the support is made); for example, this is the case for a support with intrinsic curvature properties, such as a roll of photographic negatives.

In this case, the method is similar to the method explained above in paragraph 1b.

However, in this case 2, we can then preferably choose a mathematical model representing the intrinsic properties of the material used for the support.

The invention then has two advantages. Firstly the number of sensors required can then be limited, possibly up to an optimal limit in adequacy with the geometric model of the material. Secondly, manipulation of the device according to the invention is then facilitated by the stiffness properties of the support.

3. Case in which each measurement point also has a capability of measuring the distance to its nearest neighbours.

In this case, the reconstruction method can be simpler in reality, because the entire required shape can be reconstructed step by step, from one of the measurement points, based on angle and distance information.

We must have a first approximation of the complete translation vector between two measurement points, and therefore we must have three magnitudes between these two points. In general, the orientation of the vector (with 1 to 3 degrees of freedom) and the norm of this vector are measured.

4. Another variant of the method according to the invention consists of deleting the physical support of the sensors.

The sensors are then mechanically independent of each other.

In this case, the measurement points are placed at various points on a surface to be acquired. For example, such a surface could be the surface of the roof of a house or a monument.

The surface is then reconstructed step by step using the measurements, as indicated in paragraph 3 above.

Furthermore, a priori information on the acquired surface (for example the fact that the surface is composed solely of plane segments or that the maximum curvature of this surface is equal to a known value) makes it possible to limit the number of measurement points and to reconstruct all data, the use of information known a priori resulting in interpolation techniques (for example using a polynomial with a given degree or a curve that can be broken down into linear portions).

The following lists various advantages of this invention:

it leads to a user-friendly easy-to-use system for acquisition of data in three dimensions;

since it is based on orientation measurements (first derivative), it only requires one integration, unlike sensors that measure the curvature (second derivative) and that therefore require two integrations;

it enables the use of conventional and inexpensive sensors to make a device conforming with the invention at low cost;

it is compatible with measurements made on lightweight materials such as textiles and paper, and can therefore be applied to such materials;

the device according to the invention can either be integrated firstly into an initial material, or added onto an existing material;

the scalability of the device according to the invention is such that it can be adapted to various sizes of applications;

in addition, the invention makes it possible to monitor variations in the shape of a curve or a surface as a function of time.

Another example of the invention is given below, also for information and in no way limitative.

A device according to the invention (line-shaped support) is placed on the periphery of a wheel (not shown) located in a vertical plane, the length of the device being at least equal to the perimeter of this wheel.

The sensors used are accelerometers and are placed uniformly on the device, at a distance d from each other. The angle measured by each measurement point then corresponds to an inclination from a vertical direction, that varies from one point to the next by $\Delta\alpha = d/R$, where R is the radius of the wheel.

But such a device also measures a local deformation, for example a plane portion of a deflated tyre, this portion being in contact with the ground.

Another example of the invention is given below, also for information and in no way limitative.

A support composed of a flexible printed circuit such as a <<flex>> is used. For example, the length of this printed circuit is 2 meters and its width is 1 or 2 cm.

A set of four sensors are placed flat on the circuit (for example in the form of a tape) at regular intervals, for example every cm, every 2 cm or every 5 cm, for example two accelerometers and two magnetometers sensitive to the earth's magnetic field. A single type of sensor can be used or different types can be alternated (with limitations on the performances of the device obtained), or other types of sensors can be used.

Sensors may be models with a digital output or with an analogue output.

Information is collected along the flexible circuit by an I2C type bus. It is collected by an I2C interface and transmitted to an RS serial link or a parallel link or a USB interface or transmitted through a Bluetooth or WiFi wireless link. Finally, it reaches a PC where it is processed using one of the methods described above.

The result is used by a three-dimensional display software or for control of a numerical machine.

The invention claimed is:

1. A method for acquisition of a warped geometric shape, namely a warped curve or a warped surface, by determining the coordinates of the points on this warped curve or this warped surface, the method comprising:

placing a set of sensors on the warped geometric shape, the sensors being chosen among accelerometers and magnetometers, each accelerometer configured to sense inclination relative to the vertical direction and each magnetometer configured to sense inclination relative to magnetic north, each sensor being designed to output signals representative of the inclination of the local tangent to the curve or of the inclinations of the local tangent plane to the surface, at the location of the sensors with respect to the vertical direction in the case of accelerometers or with respect to the direction of the earth's magnetic field in the case of magnetometers; and modeling the curve or the surface by:

treating a distance between adjacent sensors as a straight line segment;

obtaining an inclination measurement from a sensor at an end of each segment, each said segment corresponding to a tangent of the shape at that segment; and determining the spatial distribution of the points on the geometric shape by a step by step reconstruction of the straight line segments.

2. A method according to claim 1, in which the sensors are fixed to a support made of a deformable solid material capable of matching the shape to be acquired.

3. A method according to claim 2, in which the support forms a line.

4. A method according to claim 3, in which the support is flexible.

5. A method according to claim 2, in which the support forms a surface.

6. A method according to claim 5, in which the support is flexible.

7. A method according to claim 2, in which the support is flexible.

8. A method according to claim 1, in which the shape to be acquired has one or several maximum spatial frequencies and the number of sensors per unit length or unit area is equal to at least twice the value of the maximum frequency, and the curve or the surface is locally sampled using the sensors.

9. A method according to claim 1, in which the sensors are mechanically independent of each other, and the shape to be acquired is reconstructed step by step using signals output by the sensors.

10. A method according to claim 1, in which the shape of a curve or a surface that delimits an object is acquired.

11. A method according to claim 1, in which the intrinsic shape of the solid and deformable material itself is acquired.

12. A method according to claim 1, in which each sensor is also designed to determine the distance that separates it from nearby sensors, and in which the shape to be acquired is reconstructed step by step.

13. A device for acquisition of a warped geometric shape, namely a warped curve or a warped surface, the device comprising:
- a set of sensors, the sensors being chosen among accelerometers and magnetometers, each accelerometer configured to sense inclination relative to the vertical direction and each magnetometer configured to sense inclination relative to magnetic north, each sensor being designed to output signals representative of the inclinations of the local tangent to the curve or of the inclination of the local tangent plane to the surface, at the location of the sensor with respect to the vertical direction in the case of accelerometers or with respect to the direction of the earth's magnetic field in the case of magnetometers; and
- electronic means for processing signals output by the sensors, the electronic means being designed to determine model parameters using a mathematical model of the curve or the surface, and to use these parameters to determine the spatial distribution of points on the geometric shape by:
- treating a distance between adjacent sensors as a straight line segment;
- obtaining an inclination measurement from a sensor at an end of each segment, each said segment corresponding to a tangent of the shape at that segment; and
- determining the spatial distribution of the points on the geometric shape by a step by step reconstruction of the straight line segments.

14. A device according to claim 13, in which the sensors are fixed to a support made of a solid and deformable material, capable of matching the shape to be acquired.

15. A device according to claim 13, in which the sensors are mechanically independent of each other.

16. A method for acquisition of a warped geometric shape, namely a warped curve or a warped surface, by determining the coordinates of the points on this warped curve or this warped surface, the method comprising:
- placing a set of sensors on the warped geometric shape, the sensors being chosen among accelerometers and magnetometers that are configured to sense inclination relative to a reference direction, each sensor being designed to output signals representative of the inclination of the local tangent to the curve or of the inclinations of the local tangent plane to the surface, at the location of the sensors with respect to the vertical direction in the case of accelerometers or with respect to the direction of the earth's magnetic field in the case of magnetometers; and
- modeling the curve or the surface by:
- treating a distance between adjacent sensors as a straight line segment;
- obtaining an inclination measurement from a sensor at end of each segment, each said segment corresponding to a tangent of the shape at that segment; and
- determining the spatial distribution of the points on the geometric shape by a step by step reconstruction of the straight line segments.

17. A method according to claim 16, in which the sensors are fixed to a support made of a deformable solid material capable of matching the shape to be acquired.

18. A method according to claim 16, in which the shape to be acquired has one or several maximum spatial frequencies and the number of sensors per unit length or unit area is equal to at least twice the value of the maximum frequency, and the curve or the surface is locally sampled using the sensors.

* * * * *